(12) United States Patent
Bergeron

(10) Patent No.: US 7,023,349 B2
(45) Date of Patent: Apr. 4, 2006

(54) SECURITY DEVICE FOR AIRCRAFT PASSENGERS

(76) Inventor: Rock Bergeron, 1520 Rue, Des Coteaux Appt 204, Ancienne Lorette, Québec City Quebec (CA), G2E 2E4

( * ) Notice: Subject to any disclaimer, the term of this patent is extended or adjusted under 35 U.S.C. 154(b) by 198 days.

(21) Appl. No.: 10/292,419

(22) Filed: Nov. 12, 2002

(65) Prior Publication Data
US 2004/0104819 A1 Jun. 3, 2004

(51) Int. Cl.
*G08B 23/00* (2006.01)

(52) U.S. Cl. .................... 340/573.1; 119/720; 361/232
(58) Field of Classification Search ............. 340/573.1, 340/573.3, 572.9, 825.69; 119/720, 859; 361/232
See application file for complete search history.

(56) References Cited

U.S. PATENT DOCUMENTS

| | | | | |
|---|---|---|---|---|
| 2,645,922 A | * | 7/1953 | Martin | 70/16 |
| 4,173,974 A | * | 11/1979 | Belliveau | 70/16 |
| 4,811,775 A | * | 3/1989 | Sun | 70/16 |
| 4,943,885 A | * | 7/1990 | Willoughby et al. | 361/232 |
| 5,528,450 A | * | 6/1996 | Willoughby et al. | 361/232 |
| 6,147,610 A | * | 11/2000 | Yarnall et al. | 340/573.3 |
| 6,160,481 A | * | 12/2000 | Taylor, Jr. | 340/573.4 |
| 2001/0035134 A1 | * | 11/2001 | Stapelfeld et al. | 119/720 |
| 2002/0046713 A1 | * | 4/2002 | Otto | 119/720 |
| 2003/0045132 A1 | * | 3/2003 | Lee | 439/34 |
| 2003/0214418 A1 | * | 11/2003 | Hahne et al. | 340/825.69 |

FOREIGN PATENT DOCUMENTS

DE 10150929 * 10/2001

* cited by examiner

*Primary Examiner*—Daniel Wu
*Assistant Examiner*—Samuel J. Walk

(57) ABSTRACT

A safety device to be worn by passengers of an aircraft comprising a bracelet and means to link a number of these bracelets to monitor and to track the movements of passengers and when needed immobilise a passenger if his behaviour proves dangerous. The bracelet may comprise means of identification, communication, indicators and active elements subjected to an external control.

10 Claims, 3 Drawing Sheets

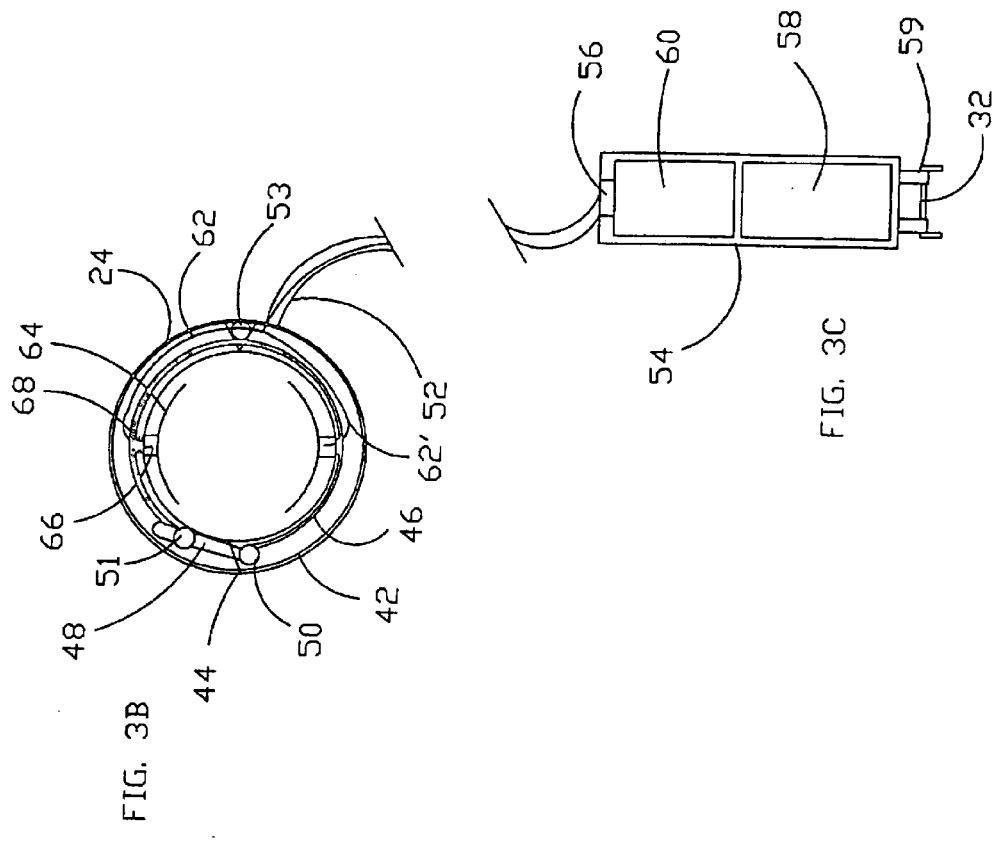
FIG. 3B
FIG. 3C
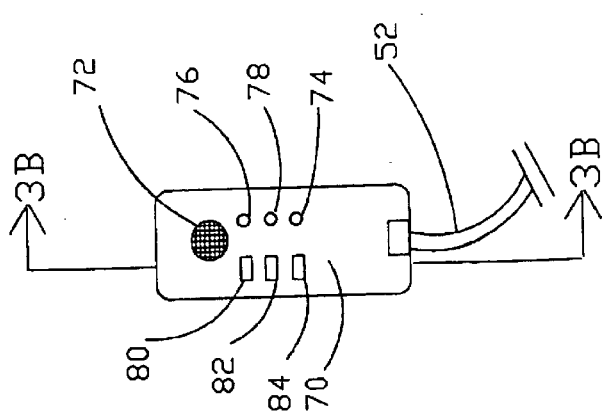
FIG. 3A

SECURITY DEVICE FOR AIRCRAFT PASSENGERS

BACKGROUND OF THE INVENTION

1. Field of the Invention

This invention relates to the field of safety devices and more precisely to the safety of passengers of an aircraft by providing a device which restricts movement of the passengers during the flight.

2. Description of the Prior Art

Certain patents particularly drew our attention: U.S. Pat. No. 4,726,550, Chen. 23 Feb. 1988, modifies an aircraft by incorporating a broad door and slide bars under the seats to move and take seats outside an aircraft.

OBJECTS OF THE INVENTION

It is a general objective of the invention to provide a system to restrict movement of a passenger in particular, as discreetly as possible. This should be done while respecting the comfort of the passengers and without obstructing their movements, to prevent undesired actions of any passenger, particularly movements towards the cockpit.

Another object is to provide each passenger with a bracelet that cannot be taken off without an access code at the arrival or departure. A bracelet which comprises controls to restrict the movement of the passengers according to predetermined restrictions. This device is also to comprise staff-controlled monitors at suitable locations.

BRIEF DESCRIPTION OF THE DRAWINGS

The present invention will be further understood from the following description with reference to the drawings in which:

FIG. 3A is a schematic of the bracelet device.

FIG. 3B is a section cut according to line 3B—3B of FIG. 3A.

FIG. 3C is a detail of the device of FIG. 3A.

DETAILED DESCRIPTION OF A PREFERRED EMBODIMENT

Figure 1A:
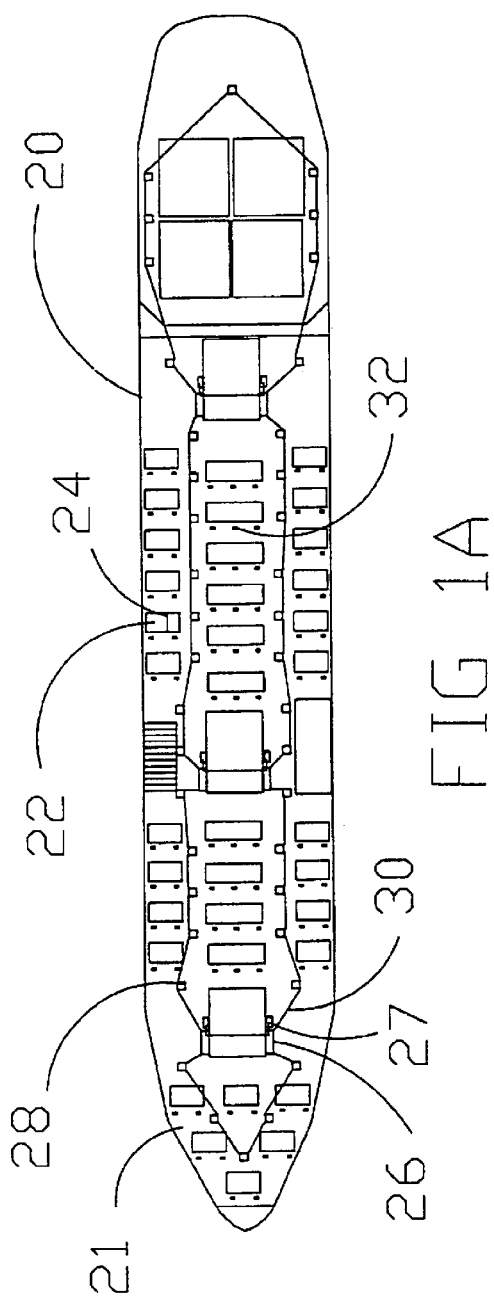
FIG. 1A is a view of a safety device assembly on one floor.

An embodiment of the invention is illustrated in the drawings wherein the same numbers identify the same characterizing elements.

FIG. 1A shows the cabin of an aircraft 20 and at the rear of a cockpit 21, some passenger' seats 22. Each passenger wears a bracelet 24. A computer 26, by the cockpit 21 is used as a control panel for the bracelets. Sensors 28 form an electronic line 30 around the aircraft, including the cabin and the seats. These sensors 28 are preferably over an aisle and possibly hidden in the walls. The sensors 28 are used to restrict and follow movements of a bracelet 40 around the aircraft. There is a link 31 shown in FIG. 1B between each seat that is in turn linked to the main board of the computer 26. This link 31 is at floor level, preferably mounted in the front of a seat, to protect it from dust. A receptacle 32, connected to the link 31 and located at each seat makes it possible to check that all the passengers are in their seat at take off. This receptacle 32 may be used to keep a passenger at its seat throughout the flight. The receptacle 32 receives a prong which is related to the bracelet 24 of a passenger. The receptacle 32 may be locked to the link 31 in which case the passenger is maintained in locking position against link 31 and could not move away unless disengaged by a staff controlled monitor 27.

Figure 1B:
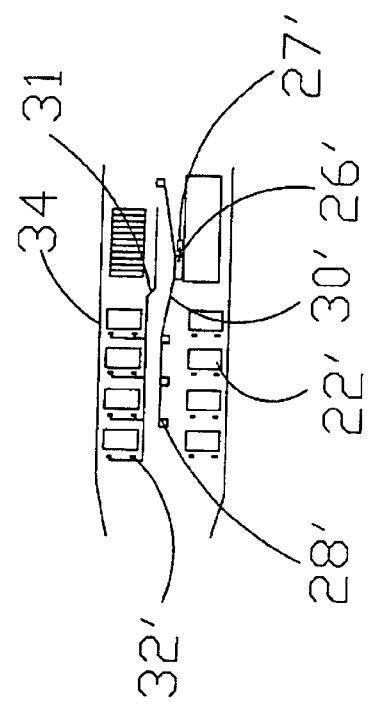
FIG. 1B is a view of the device of FIG. 1A on a second level.

FIG. 1B shows the same device installed on a second floor 34 of a large aircraft. There are passenger seats 22', a computer 26', sensors 28', an electronic belt 30', a second staff controlled monitor 27' and receptacles 32' at each seat.

Figure 2:
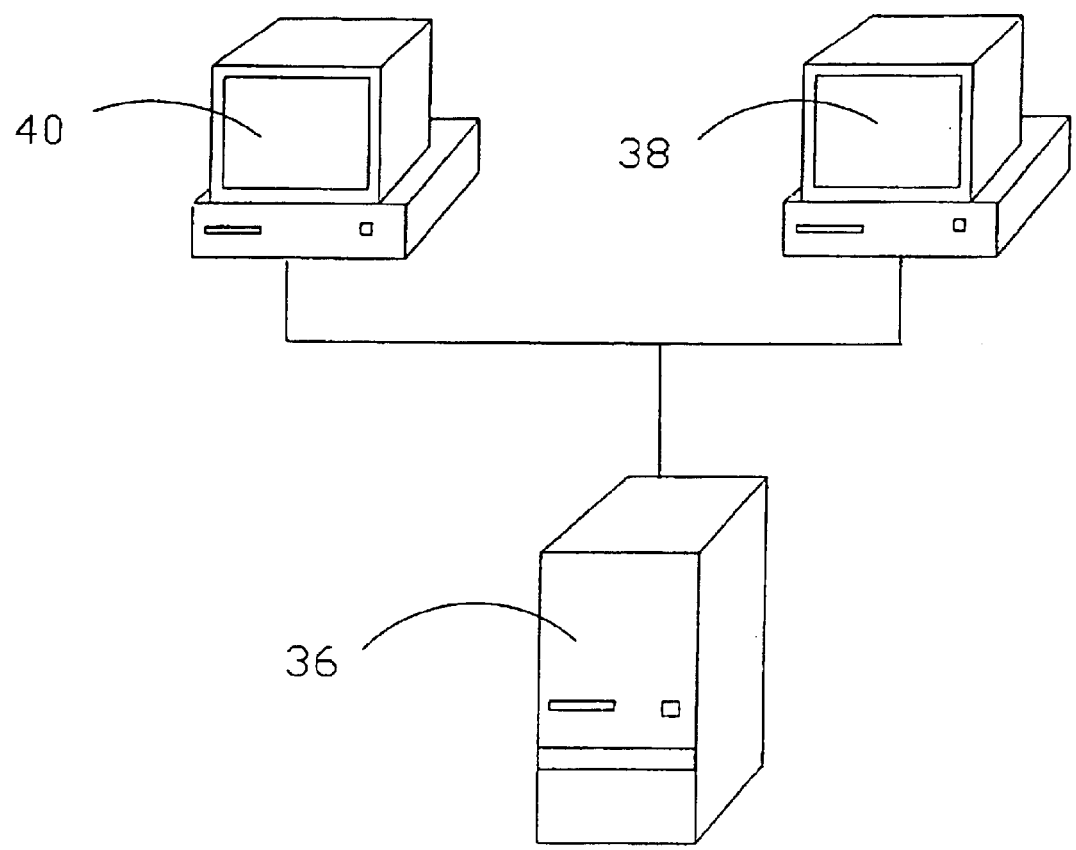
FIG. 2B is a view of the monitors.

FIG. 2 shows the computers that are used outside the aircraft. A main computer 36, used as data base source for the carrier company, when issuing a ticket and a seat, and it programs a code corresponding to the seat. A second computer 38 is used as interface to enter the data of the flight before a passenger exits the gate to the aircraft, the passenger receiving the bracelet with a secret code entered by the computer 38. A third computer 40 is used by the same carrier to lock and unlock the bracelet no matter the airport, especially at the arrival at destination airport.

FIG. 3A shows schematics of the bracelet 24 indicating all the communication functions present on an external face 70 of the bracelet. Those comprise a call button 74 to a flight attendant, a "no takeoff>> indicator 76 and a takeoff indicator 78 indicating that the departure check has been made. A speaker 72 or a vibrator informs the passenger to comply with the guideline. There also are LED that indicate the status of the system, that is, a green light 84 for normality, a yellow light 82 for danger and a red light 80 for a catastrophe.

FIG. 3B shows a section of the bracelet 24 and its components: a hard plastic ring 42 with ends meeting at a junction point 44. A strengthening wire 46 is laid out on its inner side and completes the ring with a lock 48. The lock 48 comprises an opening 50 to receive a screw and one nut 51. On the other side of the lock is a cable 52 located close to a hinge 53. Two wires 62 come out of the cable 52 to supply current to electrodes 64. These electrodes 64 may be applied against the wrist to send a charge to an offender. The electrodes 64 usually face towards the skin of the wrist. They are placed on a mount 66 that is pushed by a spring 68. The tension of the spring 68 may vary to take into account the comfort and the efficiency of the electrical charge. Other types of electrodes, cables and location may also be used.

FIG. 3C shows the cable that leads to a neutralizing box 54, which is used for passenger control and which is held by the passenger and attached to his/her bracelet. This box 54 has, as prongs, an interlock 59 which is to be connected to the receptacle 32, present at each seat and in the bathroom. The box 54 may be put on check status at any time to remain locked or to be unlocked. A receiver 56 links the cable 52 and the box 54. The neutralizing box 54 comprises a power source 58, like a battery of specific dimension. The interlock 59 connects the box 54 to the receptacle 32. A transceiver 60 controls the quantity of voltage applied from a battery source 58 and sent through the cable 52 to act upon the electrodes 64.

The transceiver comprises a timer to apply a signal which triggers a discharge from the power source 58 relayed through the bracelet to discharge energy onto a captive wrist. The amount of energy may be monitored by varying intensity lights, yellow for low intensity, amber for light intensity and red for high intensity corresponding to shock and subject to heat, the amount of heat depending on the time limits.

METHOD AND RAMIFICATIONS

The system comprises elements connected in a way that complies with aesthetics of the aircraft and the freedom of movement of the passengers while providing a quasi absolute feeling of safety from quarrelsome passengers whether on a short or long distance flight. This system is very discreet as it does not require armed attendant or warning calls as everything is done within the authorised aisle. One or more control boards may be used in accordance with the type of aircraft and the number of compartments, first class, tourist class, upper deck.

Each passenger wearing a bracelet would be assured that all on board profit from a maximum safety, as any passenger who leaves the allowed perimeter would be neutralized through the bracelet. The act itself will be discreet but the shock may be strong when there is red alert status. The bracelet should be locked throughout the flight. Never at any time should a passenger have the opportunity to remove it. In fact, this bracelet is made of a rubber, plastic or other material that resists the strength of any man. Knives being already prohibited, they cannot be cut. The passengers will thus have a feeling of safety while having the freedom of moving inside an authorized perimeter, even meetings with friends or colleagues in a controlled section. There is no feeling of militarism as the programming of the control device is done outside the aircraft. There is no need for armed guards to neutralize offenders as their movement are already restricted by the bracelet. A type of bracelet could be adapted on a foot or even adapted for the transport of animals.

Each flight attendant has the responsibility to authorize or prohibit movement. This can de done remotely or with a portable monitor 27 protected by a coded system and linked to the on board computer 26. Moreover, during a red alert 80, the computer 26 can lock the cockpit door.

It is clearly understood that the mode of realization of this invention which was described above, in reference to the annexed drawings, was given as an indication and is by no means restricive, and modifications and adaptions can be brought without the object deviating from all that the framework of this invention.

Other embodiments are possible and limited only by the scope of the appended claims.

Part List

20 Aircraft
21 Cockpit
22 Seat
24 Bracelet
26 On board computer
27 Staff monitor
28 Sensors
30 Electronic belt
31 Link
32 Receptacle
34 Second floor
36 Main Computer
38 Second computer
40 Third Computer
42 Plastic ring
44 Junction
46 Strengthening Wire
48 Lock
50 Opening
51 Nut
52 Cable
53 Hinge
54 Neutralizing box
56 Receiver
58 Power source
59 Interlock
60 Transceiver
62 Wire
64 Electrodes
66 Mount
68 Spring
70 Outer Face
72 Speaker
74 Call Button
76 "no take off" Indicator
78 Takeoff Indicator
80 Red light
82 Yellow light
84 Green light

I claim:

1. A safety device for the passengers of an aircraft comprising:
    bracelets (24) worn by each passenger aboard an aircraft during a flight;
    belt means to relate said bracelets together,
    an electronic authorized perimeter on said aircraft allowing a certain freedom of movement to said people; and
    means related to said belt means for controlling constantly said bracelets (24) in said perimeter during said flight.

2. The safety device of claim 1 wherein said passengers occupy seats inside an aircraft, behind a cockpit (21), each passenger of each said seat wearing said bracelet (24) and said means for controlling comprise:
    controllable data carried by said bracelets, computer means used as control panel for said data of said bracelets according to said seats.

3. A safety device for the passengers of an aircraft comprising:
    bracelets (24) worn by each person of a group of people aboard an aircraft during a flight;
    an authorized perimeter on said aircraft allowing a certain freedom of movement to said people; and
    means for controlling constantly said bracelets (24) in said perimeter during said flight wherein said means for controlling comprise:
    passenger seats inside said aircraft, behind a cockpit (21), each passenger of each said seat wearing said bracelet (24),
    controllable data carried by said bracelets,
    a computer used as control panel for said data of said bracelets according to said seats and an electronic belt (30) inside said aircraft, said belt comprising a number of sensors being used to witness movements out of said perimeter and to send a signal to said bracelets and to said computer.

4. The device of claim 3 wherein said electronic belt comprises a link (31) relating each said seat and having a number of receptacles (32) corresponding to the number of said seats, said link (31) being connected to the main hoard of said computer (26), said receptacles destined to connect with said bracelet.

5. The device of claim 2 wherein each said bracelet comprises a neutralising box (54) comprising:
    an energy source (58),
    a transceiver (60) comprising said data,
    means to relate said neutralising box (54) to said bracelet,
    said transceiver receiving said signal and analysing said data, thereupon triggering said energy source to enact upon said bracelet.

6. The device of claim 5 wherein said neutralising box (54) further comprises an interlock (59) to lock into said receptacle, thereby immobilising a passenger at his seat.

7. The device of claim 3 wherein said bracelet comprises an electrode (64) adapted against the wrist of a passenger bearer and destined to cause a stimulation against said wrist.

8. The device of claim 4 wherein said transceiver comprises a timer to apply said signal onto said wrist and over different time and light intensity stages, from amber light for low intensity to shock and heat for high intensity.

9. The device of claim 5 wherein a link (31) relating each said seat and having a number of receptacles (32) corresponding to the number of said seats, said link (31) being connected to the main board of said computer (26), said neutralising box (54) comprising an interlock (59) to lock into said receptacle, thereby immobilising a passenger at his seat.

10. The safety device of claim 4 wherein said sensors are installed over an aisle, said link (31) being at floor level, said receptacle (32) being visible from said sensor and said link and being used to restrict said passengers during said flight.

* * * * *